(12) United States Patent
Chikamori et al.

(10) Patent No.: US 11,721,212 B2
(45) Date of Patent: Aug. 8, 2023

(54) VEHICLE SYSTEM FOR DETERMINING RECOMMENDED LANE

(71) Applicant: HONDA MOTOR CO., LTD., Tokyo (JP)

(72) Inventors: Hidetoshi Chikamori, Saitama (JP); Kazumasa Nakamura, Saitama (JP); Hitoshi Konishi, Saitama (JP); Takuji Harayama, Saitama (JP); Tomoaki Masakawa, Tokyo (JP); Naofumi Aso, Saitama (JP); Ryo Matsuzawa, Tokyo (JP); Zhaoqi Wang, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 95 days.

(21) Appl. No.: 17/571,600

(22) Filed: Jan. 10, 2022

(65) Prior Publication Data

US 2022/0223036 A1 Jul. 14, 2022

(30) Foreign Application Priority Data

Jan. 12, 2021 (JP) .................................. 2021-002585

(51) Int. Cl.
*G08G 1/0967* (2006.01)
*B60W 30/18* (2012.01)
(Continued)

(52) U.S. Cl.
CPC . *G08G 1/096716* (2013.01); *B60W 30/18009* (2013.01); *G01C 21/3492* (2013.01);
(Continued)

(58) Field of Classification Search
CPC ............ G08G 1/096716; G08G 1/123; B60W 30/18009; B60W 2540/229; B60W 2552/10; B60W 2420/42; G01C 21/3492
See application file for complete search history.

(56) References Cited

U.S. PATENT DOCUMENTS 9,672,734 B1 * 6/2017 Ratnasingam .......... H04W 4/44
9,964,414 B2 * 5/2018 Slavin ................ G01C 21/3658
(Continued)

FOREIGN PATENT DOCUMENTS

JP 2017146131 A 8/2017
JP 2019184499 A 10/2019
(Continued)

OTHER PUBLICATIONS

Notice of Reasons for Refusal for Patent Application JP 2021-002585 dated Aug. 16, 2022; 8 pp.

*Primary Examiner* — Luis A Martinez Borrero
(74) *Attorney, Agent, or Firm* — Armstrong Teasdale LLP

(57) ABSTRACT

A vehicle system includes: a controller configured to communicate with a map server; and a vehicle position acquiring device configured to acquire own vehicle position information. The controller includes: a vehicle position determining unit configured to determine a lane in which an own vehicle is traveling based on the own vehicle position information; a storage unit configured to store an attendant circumstance of the own vehicle; and a recommended lane determining unit configured to determine a recommended lane. The recommended lane determining unit is configured to set a priority of each lane based on map information, determine the lane having a highest priority as the recommended lane, and exclude a travel prohibited lane, in which travel of the own vehicle is prohibited, from a candidate for the recommended lane based on restriction information and the attendant circumstance.

9 Claims, 4 Drawing Sheets

(51) Int. Cl.
  *G01C 21/34* (2006.01)
  *G08G 1/123* (2006.01)

(52) U.S. Cl.
  CPC ......... *G08G 1/123* (2013.01); *B60W 2420/42* (2013.01); *B60W 2540/229* (2020.02); *B60W 2552/10* (2020.02)

(56) References Cited

U.S. PATENT DOCUMENTS

| | | | | |
|---|---|---|---|---|
| 10,697,790 | B2* | 6/2020 | Sumizawa | G08G 1/096783 |
| 10,794,720 | B2* | 10/2020 | Slavin | G01C 21/3492 |
| 11,498,563 | B2* | 11/2022 | Hirosawa | B60W 30/18163 |
| 2001/0013837 | A1* | 8/2001 | Yamashita | G08G 1/0969 |
| | | | | 340/988 |
| 2004/0107030 | A1* | 6/2004 | Nishira | B60W 50/08 |
| | | | | 348/148 |
| 2011/0109475 | A1* | 5/2011 | Basnayake | G08G 1/096791 |
| | | | | 340/902 |
| 2013/0282264 | A1* | 10/2013 | Bastiaensen | G08G 1/0145 |
| | | | | 701/119 |
| 2014/0005923 | A1* | 1/2014 | Bank | G01C 21/3617 |
| | | | | 701/424 |
| 2014/0207377 | A1* | 7/2014 | Gupta | G01C 21/3658 |
| | | | | 701/533 |
| 2014/0278052 | A1* | 9/2014 | Slavin | G01C 21/3492 |
| | | | | 701/400 |
| 2017/0082452 | A1* | 3/2017 | Sumizawa | B60W 60/001 |
| 2017/0276492 | A1* | 9/2017 | Ramasamy | G08G 1/096758 |
| 2017/0370745 | A1* | 12/2017 | Woolley | G01C 21/36 |
| 2018/0033297 | A1* | 2/2018 | Fowe | G08G 1/0116 |
| 2018/0299290 | A1* | 10/2018 | Slavin | G08G 1/0145 |
| 2018/0345963 | A1* | 12/2018 | Maura | G05D 1/0088 |
| 2019/0383630 | A1* | 12/2019 | Lee | G01C 21/3658 |
| 2021/0039675 | A1* | 2/2021 | Lee | G01C 21/3889 |
| 2021/0122375 | A1* | 4/2021 | Takamatsu | G01C 21/3407 |
| 2021/0201051 | A1* | 7/2021 | Deselaers | G06V 20/58 |
| 2021/0207969 | A1* | 7/2021 | Bang | H04N 7/188 |
| 2022/0089177 | A1* | 3/2022 | Wang | B60W 60/001 |
| 2022/0178703 | A1* | 6/2022 | Hiroyuki | G01C 21/3658 |
| 2022/0219701 | A1* | 7/2022 | Chikamori | B60W 30/18163 |
| 2022/0219722 | A1* | 7/2022 | Chikamori | B60W 60/001 |
| 2022/0223041 | A1* | 7/2022 | Chikamori | G08G 1/096827 |

FOREIGN PATENT DOCUMENTS

| | | |
|---|---|---|
| JP | 2020020638 A | 2/2020 |
| JP | 2020094869 A | 6/2020 |
| WO | 2015190212 A1 | 12/2015 |

\* cited by examiner

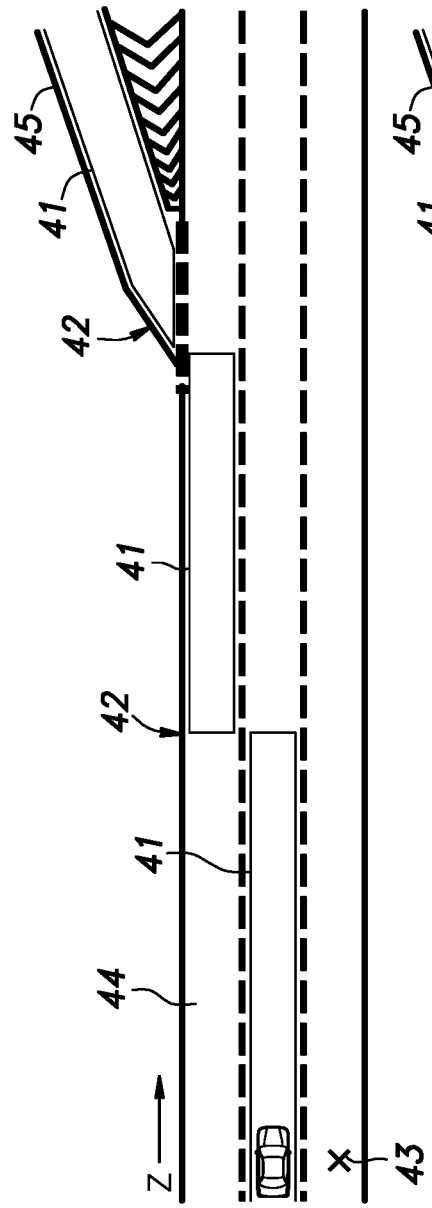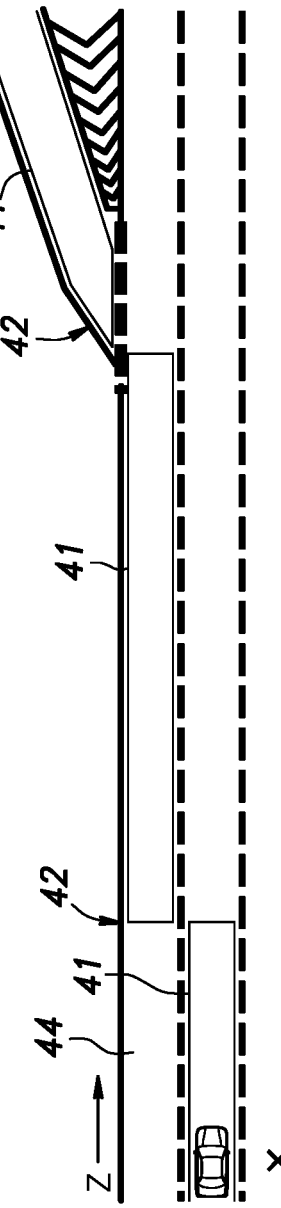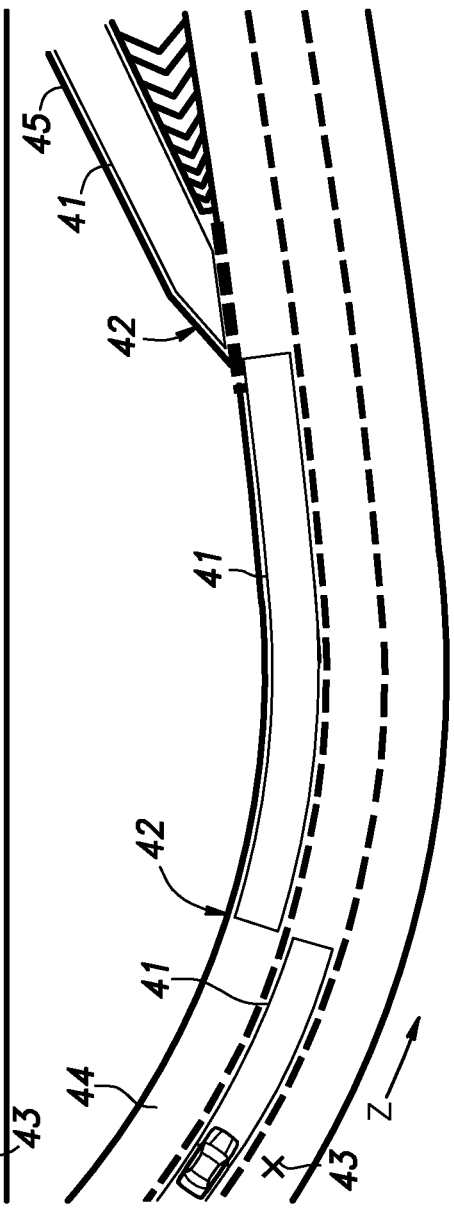

VEHICLE SYSTEM FOR DETERMINING RECOMMENDED LANE

TECHNICAL FIELD

The present invention relates to a vehicle system for determining a recommended lane for an own vehicle in a case where the own vehicle travels on a road having a plurality of lanes on one lateral side thereof.

BACKGROUND ART

Map information has been used for vehicle navigation and autonomous driving (for example, JP2020-20638A). In conventional map information, restriction information and traffic congestion information for each travel direction have been included, but information for each lane has not been included. In recent years, a high-precision map including the restriction information and the traffic congestion information for each lane has been proposed (for example, JP2019-184499A).

SUMMARY OF THE INVENTION

If a recommended lane determining device for determining a recommended lane for an own vehicle can acquire the traffic congestion information and the restriction information for each lane, then such a device can determine the recommended lane more appropriately than the conventional technique. In view of such a background, an object of the present invention is to provide a vehicle system for determining a recommended lane for an own vehicle by utilizing a high-precision map so as to improve driving comfort.

To achieve such an object, one aspect of the present invention provides a vehicle system (2) for determining a recommended lane (41) for an own vehicle in a case where the own vehicle travels on a road having a plurality of lanes on one lateral side thereof, the vehicle system (2) comprising: a controller (16) configured to communicate with a map server (3) that stores map information including traffic information and restriction information on each lane, the traffic information including current traffic state information on each lane and/or a statistic of a past traffic state of each lane, the restriction information corresponding to an attendant circumstance of the own vehicle selected from a group consisting of (or an attendant circumstance of the own vehicle including at least one of) the number of occupants, a registered number of the own vehicle, a using schedule of a specific lane, and a vehicle type; and a vehicle position acquiring device (7, 10) configured to acquire own vehicle position information for determining the lane in which the own vehicle is traveling and transmit the own vehicle position information to the controller (16), wherein the controller (16) includes: a vehicle position determining unit (31) configured to determine the lane in which the own vehicle is traveling based on the own vehicle position information; a storage unit (34) configured to store the attendant circumstance of the own vehicle; and a recommended lane determining unit (32) configured to determine the recommended lane (41), and the recommended lane determining unit (32) is configured to set a priority of each lane based on the map information, determine the lane having a highest priority as the recommended lane (41), and exclude a travel prohibited lane from a candidate for the recommended lane (41) based on the restriction information and the attendant circumstance, the travel prohibited lane being the lane in which travel of the own vehicle is prohibited.

According to this aspect, the lane in which the travel of the own vehicle is prohibited is excluded from the recommended lane, so that the own vehicle can be prevented from entering such a lane, the comfort of the driver can be improved, and the driver can be relieved.

In the above aspect, preferably, the traffic state information includes an average vehicle speed of a plurality of vehicles traveling in each lane, and the recommended lane determining unit (32) is configured to raise the priority of the lane in which the vehicles are traveling at the average vehicle speed closest to a target vehicle speed of the own vehicle.

According to this aspect, the own vehicle can travel at a speed close to the target vehicle speed, so that the required time to the destination can be shortened.

In the above aspect, preferably, the recommended lane determining unit (32) is configured to calculate a congestion degree of each lane based on the traffic state information and/or the statistic, and lower the priority of the lane whose congestion degree in front of the own vehicle is equal to or more than a prescribed value.

According to this aspect, the recommended lane is likely to be set so as to avoid a traffic congestion area, so that the required time to the destination can be shortened.

In the above aspect, preferably, the vehicle system (2) further comprises a camera (25) configured to capture a driver, wherein the controller (16) further includes an attention determining unit (33) configured to determine an attention level of the driver as to driving based on an image captured by the camera (25), and the recommended lane determining unit (32) is configured to raise the priority of the lane in which the own vehicle is traveling in a case where the attention level is equal to or less than a prescribed value during manual driving.

According to this aspect, in a case where the attention of the driver declines during the manual driving, the lane in which the own vehicle is traveling is likely to be set to the recommended lane, so that the lane change can be suppressed.

In the above aspect, preferably, the storage unit (34) is configured to store travel performance information selected from a group consisting of (or travel performance information including at least one of) a travel distance, a travel time, and a travel frequency of each lane in which the own vehicle has traveled during manual driving, and the recommended lane determining unit (32) is configured to raise the priority of the lane with highest travel performance based on the travel performance information.

According to this aspect, the lane the driver prefers is likely to be set to the recommended lane, so that the comfort of the driver can be improved.

In the above aspect, preferably, the storage unit (34) is configured to further store a preference mode selected from a group consisting of (or a preference mode including): a first preference mode; and a second preference mode to suppress a lane change as compared with the first preference mode, and the recommended lane determining unit (32) is configured to raise the priority of the lane in which the own vehicle is traveling at a time when the preference mode is set to the second preference mode as compared with a time when the preference mode is set to the first preference mode.

According to this aspect, the probability of switching of the recommended lane is changed according to the preference of the driver, so that the comfort of the driver can be improved.

Thus, according to the above aspects, it is possible to provide a vehicle system for determining a recommended lane for an own vehicle by utilizing a high-precision map so as to improve driving comfort.

BRIEF DESCRIPTION OF THE DRAWING(S)

FIG. 3A is an explanatory diagram showing the recommended lane set by the vehicle system wherein a congestion degree of a branching connection lane is less than a prescribed value;

Figure 4:
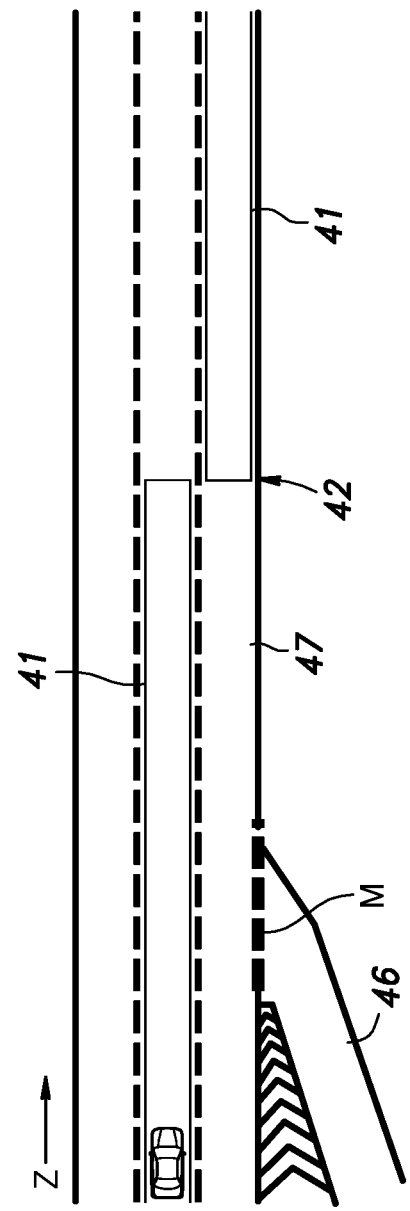

FIG. 3B is an explanatory diagram showing the recommended lane set by the vehicle system wherein the congestion degree of the branching connection lane is equal to or more than a prescribed value; and FIG. 3C is an explanatory diagram showing the recommended lane set by the vehicle system wherein the branching connection lane is curved in front of the vehicle and before the branching route; and FIG. 4 is an explanatory diagram showing the recommended lane set by the vehicle system (in a case where a merging route is present) according to the embodiment.

DETAILED DESCRIPTION OF THE INVENTION

In the following, a map information system 1 according to an embodiment of the present invention will be described with reference to the drawings.

Figure 1:
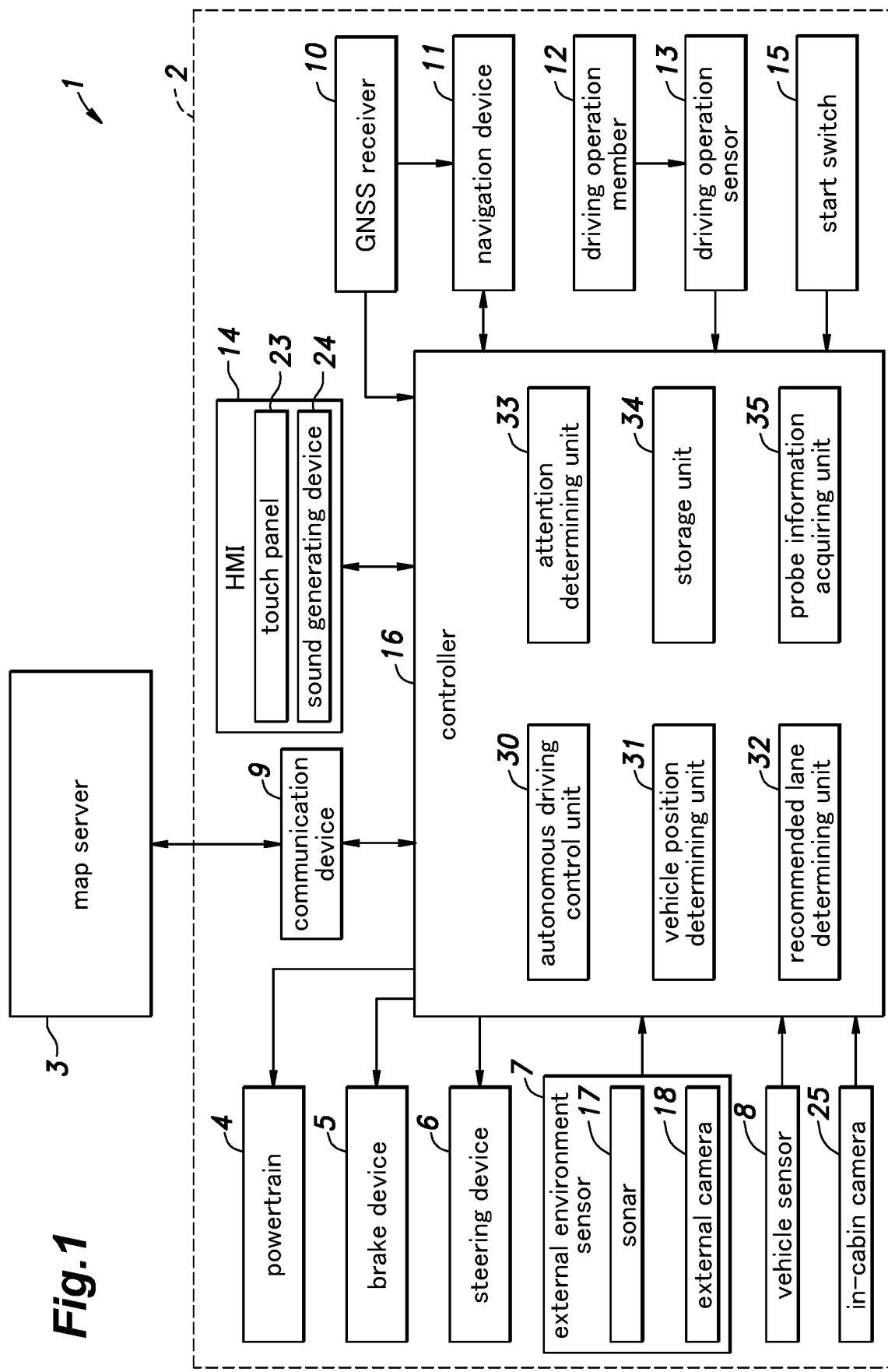
FIG. 1 is a block diagram showing a map information system according to an embodiment.

As shown in FIG. 1, the map information system 1 includes a vehicle system 2 mounted on a vehicle, and a map server 3 connected to the vehicle system 2 via a network.

<The Vehicle System>

First, the vehicle system 2 will be described. The vehicle system 2 includes a powertrain 4, a brake device 5, a steering device 6, an external environment sensor 7, a vehicle sensor 8, a communication device 9, a GNSS receiver 10, a navigation device 11, a driving operation member 12, a driving operation sensor 13, an HMI 14, a start switch 15, and a controller 16. Each component of the vehicle system 2 is connected to each other via a communication means such as Controller Area Network (CAN) such that signals can be transmitted therebetween.

The powertrain 4 is a device configured to apply a driving force to the vehicle. For example, the powertrain 4 includes at least one of an internal combustion engine (such as a gasoline engine and a diesel engine) and an electric motor. The brake device 5 is a device configured to apply a brake force to the vehicle. For example, the brake device 5 includes a brake caliper configured to press a pad against a brake rotor and an electric cylinder configured to supply an oil pressure to the brake caliper. The brake device 5 may further include a parking brake device configured to restrict rotation of wheels via wire cables. The steering device 6 is a device configured to change the steering angles of the wheels. For example, the steering device 6 includes a rack-and-pinion mechanism configured to steer the wheels and an electric motor configured to drive the rack-and-pinion mechanism. The powertrain 4, the brake device 5, and the steering device 6 are controlled by the controller 16.

The external environment sensor 7 is a sensor configured to detect an object outside the vehicle or the like by capturing electromagnetic waves, sound waves, or the like from the surroundings of the vehicle. The external environment sensor 7 includes a plurality of sonars 17 and a plurality of external cameras 18. The external environment sensor 7 may further include a millimeter wave radar and/or a laser lidar. The external environment sensor 7 is configured to output a detection result to the controller 16.

Each sonar 17 consists of a so-called ultrasonic sensor. The sonar 17 emits ultrasonic waves to the surroundings of the vehicle and captures the reflected waves therefrom, thereby detecting a position (distance and direction) of the object. The plurality of sonars 17 are provided at a rear part and a front part of the vehicle, respectively.

Each external camera 18 is a device configured to capture an image of the surroundings of the vehicle. For example, the external camera 18 is a digital camera that uses a solid imaging element such as a CCD and a CMOS. The external camera 18 may consist of a stereo camera or a monocular camera. The plurality of external cameras 18 include a front camera configured to capture an image in front of the vehicle, a rear camera configured to capture an image behind the vehicle, and a pair of side cameras configured to capture images on both lateral sides of the vehicle.

The vehicle sensor 8 is a sensor configured to detect the state of the vehicle. The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, a direction sensor configured to detect the direction of the vehicle, and the like. For example, the yaw rate sensor consists of a gyro sensor. The vehicle sensor 8 may further include an inclination sensor configured to detect the inclination of a vehicle body and a wheel speed sensor configured to detect the rotational speed of each wheel.

The communication device 9 is configured to mediate communication between the controller 16 and a device (for example, the map server 3) outside the vehicle. The communication device 9 includes a router configured to connect the controller 16 to the Internet. The communication device 9 may have a wireless communication function of mediating wireless communication between the controller 16 and the controller of the surrounding vehicle and between the controller 16 and a roadside device on a road.

The GNSS receiver 10 (the own vehicle position identifying device) is configured to receive a signal (hereinafter referred to as "the GNSS signal") from each of satellites that constitute a Global Navigation Satellite System (GNSS). The GNSS receiver 10 is configured to output the received GNSS signal to the navigation device 11 and the controller 16.

The navigation device 11 consists of a computer provided with known hardware. The navigation device 11 is configured to identify the current position (latitude and longitude) of the vehicle based on the previous travel history of the vehicle and the GNSS signal outputted from the GNSS receiver 10. The navigation device 11 is configured to store data (hereinafter referred to as "the navigation map data") on roads of a region or a country on which the vehicle is traveling. The navigation device 11 is configured to store the navigation map data in a RAM, an HDD, an SSD, or the like.

The navigation device 11 is configured to set, based on the GNSS signal and the navigation map data, a route from a current position of the vehicle to a destination input by an occupant, and output the route to the controller 16. When the vehicle starts traveling, the navigation device 11 provides the occupant with route guidance to the destination.

The navigation device 11 is configured to store, as information on roads on a map, information on points (nodes) arranged on each road and line segments (links) connecting the nodes. For example, each node stored in the navigation device 11 may be provided at a characteristic point such as an intersection or a merging point. The navigation device 11 is configured to store each link in association with a distance between the nodes connected by the link. The navigation device 11 is configured to acquire an appropriate route from the current position of the vehicle to the destination based on the distances between the nodes, and output information indicating the route to the controller 16. The outputted information indicating the route includes the points (nodes) on the road corresponding to the route and the links corresponding to vectors connecting the nodes.

The driving operation member 12 is provided in a vehicle cabin and configured to accept an input operation the occupant performs to control the vehicle. The driving operation member 12 includes a steering wheel, an accelerator pedal, and a brake pedal. The driving operation member 12 may further include a shift lever, a parking brake lever, a blinker lever, and the like.

The driving operation sensor 13 is a sensor configured to detect an operation amount of the driving operation member 12. The driving operation sensor 13 includes a steering angle sensor configured to detect an operation amount of the steering wheel, an accelerator sensor configured to detect an operation amount of the accelerator pedal, and a brake sensor configured to detect an operation amount of the brake pedal. The driving operation sensor 13 is configured to output the detected operation amount to the controller 16. The driving operation sensor 13 may further include a grip sensor configured to detect that the occupant grips the steering wheel. For example, the grip sensor consists of at least one capacitive sensor provided on an outer circumferential portion of the steering wheel.

The HMI 14 is configured to notify the occupant of various kinds of information by display and/or voice, and accept an input operation by the occupant. For example, the HMI 14 includes a touch panel 23 and a sound generating device 24. The touch panel 23 includes a liquid crystal display, an organic EL display, or the like, and is configured to accept the input operation by the occupant. The sound generating device 24 consists of a buzzer and/or a speaker. The HMI 14 is configured to display a driving mode switch button on the touch panel 23. The driving mode switch button is a button configured to accept a switching operation of a driving mode (for example, an autonomous driving mode and a manual driving mode) of the vehicle by the occupant.

The HMI 14 also functions as an interface to mediate the input to/the output from the navigation device 11. Namely, when the HMI 14 accepts the input operation of the destination by the occupant, the navigation device 11 starts a route setting to the destination. Further, when the navigation device 11 provides the route guidance to the destination, the HMI 14 displays the current position of the vehicle and the route to the destination.

The start switch 15 is a switch for starting the vehicle system 2. Namely, the occupant presses the start switch 15 while sitting on the driver's seat and pressing the brake pedal, and thus the vehicle system 2 is started.

The controller 16 consists of at least one electronic control unit (ECU) including a CPU, a ROM, a RAM, and the like. The CPU executes operation processing according to a program, and thus the controller 16 executes various types of vehicle control. The controller 16 may consist of one piece of hardware, or may consist of a unit including plural pieces of hardware. The functions of the controller 16 may be at least partially executed by hardware such as an LSI, an ASIC, and an FPGA, or may be executed by a combination of software and hardware.

The vehicle system 2 further includes an in-cabin camera 25 for capturing the occupant (for example, the driver) of the vehicle. For example, the in-cabin camera 25 consists of a digital camera using a solid imaging element such as a CCD or a CMOS. The in-cabin camera 25 is configured to output a capturing result to the controller 16. The controller 16 is configured to identify the driver based on the capturing result of the in-cabin camera 25, and store the driver and the data relating to the driving performance (travel performance) thereof such that the driver and the date are associated with each other.

<The Controller 16>

As shown in FIG. 1, the controller 16 includes an autonomous driving control unit 30 (Advanced Driver-Assistance Systems: ADAS), a vehicle position determining unit 31, a recommended lane determining unit 32, an attention determining unit 33, a storage unit 34, and a probe information acquiring unit 35. These components may be composed of separate electronic control units and connected to each other via a gateway (central gateway: CGW). Alternatively, these components may be composed of an integrated electronic control unit.

The vehicle position determining unit 31 is configured to determine the current position of the vehicle based on own vehicle position information from a vehicle position acquiring device, namely, based on the detection result of the external environment sensor 7 and the GNSS signal from the GNSS receiver 10. The object recognized based on the detection result of the external environment sensor 7 includes delimiting lines, lanes, road ends, road shoulders, obstacles, and the like, which are present on a travel route of the vehicle. In a case where the vehicle is traveling on a road having a plurality of lanes, the vehicle position determining unit 31 determines the lane in which the vehicle (the own vehicle) is traveling.

Each delimiting line is a line shown along a vehicle travel direction. Each lane is an area delimited by one or more delimiting lines. Each road end is an end of the travel route of the vehicle. Each road shoulder is an area between the delimiting line arranged at an end in the vehicle width direction and the road end. For example, each obstacle may be a barrier (guardrail), a utility pole, a surrounding vehicle, a pedestrian, or the like.

The vehicle position determining unit 31 is configured to recognize the position of the object around the vehicle with respect to the vehicle by analyzing the image captured by each external camera 18. For example, the vehicle position determining unit 31 may recognize the distance and direction from the vehicle to the object in a top view around the vehicle body by using a known method such as a triangulation method or a motion stereo method. Further, the vehicle position determining unit 31 is configured to analyze the image captured by the external camera 18, and determine the type (for example, the delimiting line, the lane, the road end, the road shoulder, the obstacle, or the like) of each object based on a known method.

The vehicle position determining unit 31 is configured to calculate a movement amount (a movement distance and a movement direction: hereinafter referred to as "the DR movement amount") of the vehicle by using dead reckoning (for example, odometry) based on a detection result of the vehicle sensor 8 such as Inertial Measurement Unit (IMU). For example, the vehicle position determining unit 31 is configured to identify an own vehicle position based on the DR movement amount when the GNSS signal cannot be received. Further, the vehicle position determining unit 31 may execute a process for improving the identification accuracy of the own vehicle position by correcting, based on the DR movement amount, the own vehicle position identified from the GNSS signal.

The recommended lane determining unit 32 is configured to determine at least one recommended lane 41 for the own vehicle based on the route outputted from the navigation device 11 and the information received from the map server 3. For example, in a case where the route received from the navigation device 11 includes a branching route 45, the recommended lane determining unit 32 adds data, which indicates a suitable lane for the travel of the vehicle, to recommended lane information on a lane link (for example, a lane link of the lane closest to the branching route 45 in a position 2 km before an entrance to the branching route 45) corresponding to a lane suitable for entering the branching route 45, thereby causing the storage unit 34 to store the recommended lane information.

The attention determining unit 33 is configured to determine an attention level of the driver as to driving based on the capturing result of the in-cabin camera 25. For example, in a case where the driver's sightline is directed to a place other than the front of the vehicle for a prescribed time period or more, or in a case where the driver takes his/her hands off the steering wheel, the attention determining unit 33 determines that the attention level of the driver as to driving declines.

The storage unit 34 includes a storage device such as an HDD and an SSD, and is configured to store the information received by the controller 16. The storage unit 34 is configured to store an attendant circumstance of the vehicle, a preference mode, a driving mode, and travel performance information (driving performance information). The attendant circumstance of the vehicle is selected from a group consisting of (or the attendant circumstance of the vehicle includes at least one of) the number of occupants, a registered number of the own vehicle, a using schedule of a specific lane, and a vehicle type. The travel performance information is selected from a group consisting of (or the travel performance information includes at least one of) a travel distance, a travel time, and a travel frequency of each lane in which the own vehicle has traveled during manual driving. Preferably, the controller 16 identifies the drivers based on the capturing result of the in-cabin camera 25, and the travel performance information is recorded for each driver. The specific lane includes a customs-only lane for vehicles with an occupant that requires payment in the customs and an ETC lane for vehicles compatible with an Electronic Toll Collection System (ETC). The ETC lane is provided near a tollgate of a toll road. The vehicle type includes a type that is classified according to the size and/or weight of the vehicle (for example, a large vehicle or a compact vehicle) and a type classified according to the use (purpose) of the vehicle (for example, an emergency vehicle such as an ambulance or a shared bus). The preference mode is selected from a group consisting of (or the preference mode includes) a sports mode (first preference mode) in which the vehicle travels by utilizing its kinetic performance and an ecology mode (a second preference mode) to reduce a load on the environment. The preference mode indicates a driving method the driver prefers, and is set by the occupant (for example, the driver) by using an input device such as the touch panel 23.

The driving mode is selected from the manual driving mode and the autonomous driving mode, and set by the occupant (driver) by using an input device such as the touch panel 23. In the manual driving mode, the controller 16 controls the powertrain 4, the brake device 5, and the steering device 6 in response to the input operation on the driving operation member 12 (for example, the steering wheel, the accelerator pedal and/or the brake pedal) by the occupant, thereby causing the vehicle to travel. On the other hand, in the autonomous driving mode, the occupant does not need to perform the input operation on the driving operation member 12, and the autonomous driving control unit 30 controls the powertrain 4, the brake device 5, and the steering device 6, thereby causing the vehicle to travel autonomously. Namely, a driving automation level of the autonomous driving mode is higher than that of the manual driving mode.

The controller 16 is configured to access the map server 3 and acquire dynamic map data, which is high-precision map information, from the map server 3. For example, as the navigation device 11 sets the route, the controller 16 acquires the latest dynamic map data of an area corresponding to the route from the map server 3 via the communication device 9.

The dynamic map data is more detailed than the navigation map data stored in the navigation device 11, and includes static information, semi-static information, semi-dynamic information, and dynamic information. The static information includes 3D map data that is more precise than the navigation map data stored in the navigation device 11. The semi-static information includes traffic regulation information, road construction information, and wide area weather information. The semi-dynamic information includes accident information, traffic congestion information, and small area weather information. The dynamic information includes signal information, surrounding vehicle information, and pedestrian information.

The static information (the high-precision map) of the dynamic map data includes information on the lanes (for example, the number of lanes) on the travel route and information on each delimiting line (for example, the type of the delimiting line) on the travel route. For example, the delimiting line of the static information is expressed as nodes arranged at smaller intervals than the nodes of the navigation map data and links connecting the nodes. The traffic regulation information, the road construction information, the accident information, and the traffic congestion information are stored for each lane.

The controller 16 is configured to acquire the high-precision map in a relatively narrow area around the vehicle and in front of the vehicle in the vehicle travel direction based on the own vehicle position identified by the vehicle position determining unit 31 and the route set by the navigation device 11. The vehicle position determining unit 31 is configured to identify the acquired high-precision map, the travel lane, and the own vehicle position in the travel lane based on the position of the delimiting line detected by the external environment sensor 7 or the like.

The probe information acquiring unit 35 associates the own vehicle position identified based on the GNSS signal with the data detected by at least one of the vehicle sensor 8 (vehicle state sensor), the driving operation sensor 13, and the external environment sensor 7, thereby acquiring and storing the own vehicle position and the data as probe information.

<The Map Server>

Next, the map server 3 will be described. As shown in FIG. 1, the map server 3 is connected to the controller 16 via the network (in the present embodiment, the Internet). The map server 3 is a computer including a CPU, a ROM, a RAM, and a storage unit such as an HDD and an SSD.

The dynamic map data is stored in the storage unit of the map server 3. The dynamic map data stored in the storage unit of the map server 3 covers a wider area than the dynamic map data stored in the controller 16.

Upon receiving a request for data from the controller 16 via the communication device 9, the map server 3 transmits the dynamic map data corresponding to the requested data to the corresponding controller 16. The transmitted dynamic map data may include the traffic congestion information, the weather information, and the like.

The vehicle system 2 is started as the occupant boards the vehicle and pushes the start switch 15 while pressing the brake pedal. In the autonomous driving mode, as the occupant inputs the destination and performs the input operation on the HMI 14 for starting autonomous driving, the vehicle travels autonomously to reach the destination. In the manual driving mode, as the occupant inputs the destination, the navigation device 11 provides the route guidance to the destination.

<Determination of the Recommended Lane>

Next, the determination of the recommended lane 41 will be described with reference to FIGS. 1 to 4. In FIGS. 3A to 3C and 4, the vehicle travel direction (which is shown by an arrow Z) is a direction from a left side to a right side therein. On a road having a plurality of lanes on one lateral side (namely, on a road having a plurality of lanes in the same vehicle travel direction), the recommended lane determining unit 32 determines the recommended lane 41 shown in FIGS. 3A to 3C and 4 along a flow shown in FIG. 2 in both the autonomous driving mode and the manual driving mode. In the autonomous driving mode, the controller 16 controls the own vehicle such that the own vehicle travels in the recommended lane 41. In the manual driving mode, the navigation device 11 causes the touch panel 23 to display the recommended lane 41, and causes the sound generating device 24 to guide the driver by voice to move the vehicle to the recommended lane 41. In a case where the recommended lane 41 is switched from one lane to another according to the travel of the vehicle in the autonomous driving mode, the controller 16 starts a lane change process (which includes a series of processes of confirming safety based on the detection result of the external environment sensor 7, blinking a turn signal, moving the vehicle to the recommended lane 41, and turning off the turn signal) at a switching point 42. In a case where the recommended lane 41 is switched as described above in the manual driving mode, the navigation device 11 causes the touch panel 23 and the sound generating device 24, at or before the switching point 42, to notify the driver that the recommended lane 41 is switched.

Depending on attendant circumstances of vehicles, the travel of vehicles with a specific attendant circumstance is prohibited in some lanes, while only the travel of vehicles with a specific attendant circumstance is permitted in other lanes. The criteria for such prohibition/permission are different depending on a country or region. For example, in some lanes such as High-Occupancy Vehicles lanes (HOV lanes) in the United States, only the travel of vehicles whose number of occupants is equal to or more than a prescribed number may be permitted. Further, in some countries such as China, the lanes in which vehicles can travel may change depending on the registered number of each vehicle. Further, lanes for vehicles with an occupant who performs a prescribed procedure at the customs may be provided, or lanes for vehicles compatible with ETC may be provided at a tollgate of a toll road. Further, lanes in which vehicles can travel may be set according to the vehicle type (for example, lanes for buses only or lanes in which the travel of large vehicles is prohibited may be provided).

The map information (dynamic map data) stored in the map server 3 includes restriction information for each lane according to such an attendant circumstance of each vehicle. The storage unit 34 stores information on the attendant circumstance, which is the information necessary in the country or region where the vehicle travels. The attendant circumstance of the vehicle is selected from a group consisting of the number of occupants, the registered number of the own vehicle, the using schedule of the specific lane, and the vehicle type. The occupant or the like may input the attendant circumstance on the touch panel 23. The controller 16 may calculate the number of occupants based on the capturing result of the in-cabin camera 25. Alternatively, in a case where the vehicle sensor 8 includes a sensor such as a piezoelectric element installed in each seat, the controller 16 may calculate the number of occupants based on the detection result of such a sensor. The recommended lane determining unit 32 excludes a travel prohibited lane 43, in which the travel of the own vehicle is prohibited, from a candidate for the recommended lane 41 based on the attendant circumstance of the own vehicle stored in the storage unit 34 and the information received from the map server 3 (S1 in FIG. 2). Namely, the recommended lane determining unit 32 determines a travel permitted lane in which the travel of the vehicle is permitted.

Figure 2:
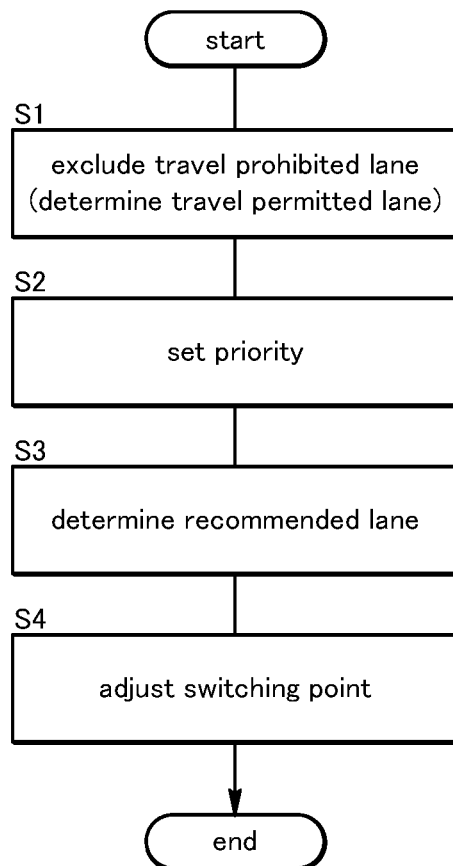
FIG. 2 is a flowchart showing how to determine a recommended lane in a vehicle system according to the embodiment.

The recommended lane determining unit 32 sets a priority of each lane based on traffic state information (map information) for each lane received from the map server 3 (S2 in FIG. 2), and determines the recommended lane 41 according to the priority (S3 in FIG. 2). For example, the recommended lane determining unit 32 may convert the priority into a numerical value so as to determine that the priority gets higher as the numerical value gets larger. The recommended lane determining unit 32 may increase or decrease the priority by increasing or decreasing the numerical value according to the event that causes such an increase or decrease of the priority, by multiplying the numerical value by a coefficient corresponding to the event, or by the combination of these methods. The recommended lane determining unit 32 may exclude the travel prohibited lane 43 from the candidate for the recommended lane 41 by minimizing the priority of the travel prohibited lane 43.

The recommended lane determining unit 32 may lower the priority of the lane that is congested or likely to be congested in front of the vehicle in the vehicle travel direction depending on a congestion degree and the distance to a congested point. The controller 16 determines the congestion degree based on a current average vehicle speed in each lane received from the map server 3 and the statistic such as a past average vehicle speed in each lane classified according to a day of a week and a time of the day. Further, the recommended lane determining unit 32 may lower the priority of the lane having an impassable point (a point where the vehicle cannot pass through due to construction, an accident, or the like) in front of the vehicle in the vehicle travel direction according to the distance to the impassable point.

The recommended lane determining unit 32 may raise the priority of a branching connection lane 44 connected to the branching route 45 that leads to the destination as the own vehicle approaches the branching route 45. The recommended lane determining unit 32 may raise the priority of the lane in which vehicles are traveling at an average vehicle speed closest to a target vehicle speed of the own vehicle stored in the storage unit 34, or raise the priority of the lane whose speed limit is closest to the target vehicle speed of the own vehicle among the lanes whose speed limit is equal to or higher than the target vehicle speed of the own vehicle stored in the storage unit 34. The occupant may set the target vehicle speed of the own vehicle by using an input device such as the touch panel 23. Alternatively, the controller 16 may calculate the target vehicle speed of the own vehicle based on the driving performance data of the driver at the same or similar location stored in the storage unit 34 and/or the speed limit of the road or the lane received from the map server 3.

During the manual driving, in a case where the attention level of the driver as to driving determined by the attention determining unit 33 becomes equal to or less than a prescribed value, the recommended lane determining unit 32 may raise the priority of the lane in which the own vehicle is traveling so as to suppress a lane change. In a case where the attention level of the driver as to driving determined by the attention determining unit 33 is higher than the prescribed value, the recommended lane determining unit 32 may enlarge the raising/lowering range of the priority due to the other factors since switching of the recommended lane 41 is allowed.

The recommended lane determining unit 32 may raise the priority of the lane (for example, a left end lane, a middle lane, or the like) the driver prefers. The driver may set the lane the driver prefers by using an input device such as the touch panel 23, and thus the storage unit 34 may store the lane the driver prefers set by the driver. Alternatively, the controller 16 may determine the lane the driver prefers based on the driving performance information (travel performance information) stored in the storage unit 34, more specifically, based on the driving performance information at a time when the vehicle has traveled in a location with the same or similar road structure. The driving performance information is selected from a group consisting of (or the driving performance information includes at least one of) a travel distance, a travel time, and a travel frequency of each lane. The recommended lane determining unit 32 may determine the lane with the highest travel performance as the lane the driver prefers.

In the ecology mode, acceleration/deceleration of the vehicle is suppressed as compared with the sports mode so as to reduce the load on the environment. In a case where the vehicle performs the lane change, the acceleration/deceleration of the vehicle may be required so as to adapt to the flow of other vehicles in the lane the vehicle will enter. Namely, the ecology mode is a mode in which the lane change should be suppressed as compared with the sports mode. Accordingly, the recommended lane determining unit 32 raises the priority of the lane in which the own vehicle is traveling in a case where the preference mode is set to the ecology mode as compared with a case where the preference mode is set to the sports mode.

Upon determining based on the priority that the recommended lane 41 should be switched to another lane, the recommended lane determining unit 32 adjusts the switching point 42 (S4 in FIG. 2). The recommended lane determining unit 32 adjusts the switching point 42 based on the congestion degree of a lane (a branching connection lane 44 in FIGS. 3A to 3C and a merging connection lane 47 in FIG. 4) to be switched to the recommended lane 41, the road structure, the vehicle type, the preference of the driver, or the combination of these factors.

FIGS. 3A to 3C each show a situation in which the recommended lane 41 is switched from the middle lane of the three lanes to the branching connection lane 44 on the left side so that the vehicle can enter the branching route 45. FIG. 3A shows a case where the branching connection lane 44 is not congested or not expected to be congested in front of the vehicle and before the branching route 45. Namely, FIG. 3A shows a case where the congestion degree of the branching connection lane 44 is less than a prescribed value. FIG. 3B shows a case where the branching connection lane 44 is congested or expected to be congested in front of the vehicle and before the branching route 45. Namely, FIG. 3B shows a case where the congestion degree of the branching connection lane 44 is equal to or more than a prescribed value. The recommended lane determining unit 32 may shift the switching point 42 of the recommended lane 41 more rearward in the vehicle travel direction in a case where the congestion degree of the lane to be switched to the recommended lane 41 is equal to or more than the prescribed value, as compared with a case where the congestion degree thereof is less than the prescribed value.

FIG. 3C shows a case where the branching connection lane 44 is curved in front of the vehicle and before the branching route 45, which causes poor visibility. In a case where the road structure of the lane to be switched to the recommended lane 41 is curved, the recommended lane determining unit 32 may shift the switching point 42 of the recommended lane 41 more rearward in the vehicle travel direction as compared with a case where the road structure thereof is straight.

At an exit of a rest area or a parking area, an interchange, or a junction, the recommended lane determining unit 32 may switch the recommended lane 41 to the merging connection lane 47 to which a merging route 46 is connected in the vicinity of a merging point M of the merging route 46 with the merging connection lane 47. In such a case, the recommended lane determining unit 32 may set the switching point 42 more forward in the vehicle travel direction than the merging point M (FIG. 4).

In a case where the own vehicle is a vehicle (for example, an emergency vehicle) that can travel preferentially over other vehicles, the recommended lane determining unit 32 may shift the switching point 42 of the recommended lane 41 more forward in the vehicle travel direction as compared with a case where the own vehicle is a common vehicle on condition that the congestion degree or the average vehicle speed of the lane in which the own vehicle is traveling is lower than that of the lane to be switched to the recommended lane 41.

The storage unit 34 may store the preference of the driver for a timing of the lane change to the recommended lane 41, and the recommended lane determining unit 32 may adjust the switching point 42 of the recommended lane 41 according to the preference thereof. Preferably, such an adjustment of the switching point 42 according to the preference of the driver is executed during the manual driving mode.

The vehicle position determining unit 31 calculates a difference between an actual start position of the lane change process during the manual driving and a position to be set to the switching point 42 during the autonomous driving, and the storage unit 34 stores this difference as the past driving performance data (travel performance data). During the manual driving, the recommended lane determining unit 32 may shift the switching point 42 from the position to be set to the switching point 42 during the autonomous driving by a distance corresponding to a representative value of the difference stored in the storage unit 34. The representative value of the difference is an average value, a central value, or the most frequent value of the difference. The occupant may input the distance by which the switching point 42 is shifted by using an input device such as the touch panel 23, and the storage unit 34 may store the above distance. Alternatively, the recommended lane determining unit 32 may determine the representative value by classifying and totaling up the difference according to the road structure or the congestion degree.

In the ecology mode, the acceleration/deceleration of the vehicle is suppressed as compared with the sports mode so as to reduce the load on the environment. In a case where the vehicle performs the lane change, sudden acceleration/deceleration (including acceleration/deceleration in the lateral direction) of the vehicle may be required so as to adapt to the flow of the vehicles in the lane the vehicle will enter. Namely, the ecology mode is a mode in which the sudden acceleration/deceleration should be suppressed as compared with the sports mode. Accordingly, the recommended lane determining unit 32 may shift the switching point 42 more rearward in the vehicle travel direction at a time when the preference mode is set to the ecology mode as compared with a time when the preference mode is set to the sports mode so that the vehicle has enough time to execute the lane change. Particularly, it is preferable to execute this process in a case where the recommended lane 41 is switched to the branching connection lane 44 to cause the vehicle to enter the branching route 45.

According to the above configurations, the lane to which the entry of the own vehicle is prohibited (namely, the lane in which the travel of the own vehicle is prohibited) is excluded from the candidate for the recommended lane 41, so that the relief and comfort of the driver can be improved. The lane in which other vehicles are traveling at an average vehicle speed close to a target vehicle speed of the own vehicle or the lane that is not congested is preferentially determined as the recommended lane 41, so that the required time to the destination is shortened. When the attention of the driver declines during the manual driving, the recommended lane 41 is unlikely to be switched. The lane the driver prefers is likely to be set to the recommended lane 41, and the number of lane changes increases/decreases depending on the preference mode, so that the comfort of the driver can be improved.

The switching point 42 is adjusted according to the congestion degree of the lane to be switched to the recommended lane 41, so that the driver can be relieved. Further, it is possible to prevent a situation where the vehicle cannot perform the lane change to the branching connection lane 44 as the distances between the vehicles traveling on the branching connection lane 44 are too short. Also, it is possible to prevent a situation where the own vehicle disturbs the travel of the following vehicle as the own vehicle is decelerated just before the branching route 45 and aggressively entering the branching connection lane 44. When the recommended lane 41 is switched to the branching connection lane 44 which has a curve with poor visibility, the switching point 42 is shifted rearward, so that the driver's anxiety due to the invisibility of the branching route 45 can be alleviated. In a case where the recommended lane 41 is switched to the merging connection lane 47 in the vicinity of the merging point M of the merging route 46 in the merging connection lane 47, the switching point 42 is shifted more forward than the merging point M, so that it is possible to prevent the own vehicle from disturbing the travel of another vehicle that is going to merge.

As described above, the recommended lane determining unit 32 determines the recommended lane 41 by utilizing the information on each lane stored in the map server 3, and thus the vehicle system 2 according to the present embodiment contributes to secure and comfortable travel of the vehicle.

Concrete embodiments of the present invention have been described in the foregoing, but the present invention should not be limited by the foregoing embodiments and various modifications and alterations are possible within the scope of the present invention.

The invention claimed is:

1. A vehicle system for determining a recommended lane for an own vehicle in a case where the own vehicle travels on a road having a plurality of lanes on one lateral side thereof, the vehicle system comprising:
   a controller configured to communicate with a map server that stores map information including traffic information and restriction information on each lane, the traffic information including current traffic state information on each lane and/or a statistic of a past traffic state of each lane, the restriction information corresponding to an attendant circumstance of the own vehicle selected from a group consisting of a number of occupants, a registered number of the own vehicle, a using schedule of a specific lane, and a vehicle type; and
   a vehicle position acquiring device configured to acquire own vehicle position information for determining a lane in which the own vehicle is traveling and transmit the own vehicle position information to the controller,
   wherein the controller includes:
   a vehicle position determining unit configured to determine the lane in which the own vehicle is traveling based on the own vehicle position information;
   a storage unit configured to store the attendant circumstance of the own vehicle; and
   a recommended lane determining unit configured to determine the recommended lane, and
   the recommended lane determining unit is configured to set a priority of each lane based on the map information, determine a lane having a highest priority as the recommended lane, and
   exclude a travel prohibited lane from a candidate for the recommended lane based on the restriction information and the attendant circumstance, the travel prohibited lane being a lane in which travel of the own vehicle is prohibited.

2. The vehicle system according to claim 1, wherein the current traffic state information includes an average vehicle speed of a plurality of vehicles traveling in each lane, and the recommended lane determining unit is configured to raise the priority of the lane in which the plurality of vehicles are traveling at the average vehicle speed closest to a target vehicle speed of the own vehicle.

3. The vehicle system according to claim 1, wherein the recommended lane determining unit is configured to calculate a congestion degree of each lane based on the current traffic state information and/or the statistic, and lower the priority of the lane whose congestion degree in front of the own vehicle is equal to or more than a prescribed value.

4. The vehicle system according to claim 1, further comprising a camera configured to capture a driver,
wherein the controller further includes an attention determining unit configured to determine an attention level of the driver as to driving based on an image captured by the camera, and
the recommended lane determining unit is configured to raise the priority of the lane in which the own vehicle is traveling in a case where the attention level is equal to or less than a prescribed value during manual driving.

5. The vehicle system according to claim 1, wherein the storage unit is configured to store travel performance information selected from a group consisting of a travel distance, a travel time, and a travel frequency of each lane in which the own vehicle has traveled during manual driving, and
the recommended lane determining unit is configured to raise the priority of the lane with highest travel performance based on the travel performance information.

6. The vehicle system according to claim 1, wherein the storage unit is configured to further store a preference mode selected from a group consisting of: a first preference mode; and a second preference mode to suppress a lane change as compared with the first preference mode, and
the recommended lane determining unit is configured to raise the priority of the lane in which the own vehicle is traveling at a time when the preference mode is set to the second preference mode as compared with a time when the preference mode is set to the first preference mode.

7. A vehicle system for determining a recommended lane for an own vehicle in a case where the own vehicle travels on a road having a plurality of lanes on one lateral side thereof, the vehicle system comprising:
a controller configured to communicate with a map server that stores map information including traffic information and restriction information on each lane, the traffic information including current traffic state information on each lane and/or a statistic of a past traffic state of each lane, the restriction information corresponding to an attendant circumstance of the own vehicle including at least one of a number of occupants, a registered number of the own vehicle, a using schedule of a specific lane, and a vehicle type; and
a vehicle position acquiring device configured to acquire own vehicle position information for determining a lane in which the own vehicle is traveling and transmit the own vehicle position information to the controller,
wherein the controller includes:
a vehicle position determining unit configured to determine the lane in which the own vehicle is traveling based on the own vehicle position information;
a storage unit configured to store the attendant circumstance of the own vehicle; and
a recommended lane determining unit configured to determine the recommended lane, and
the recommended lane determining unit is configured to set a priority of each lane based on the map information, determine a lane having a highest priority as the recommended lane, and
exclude a travel prohibited lane from a candidate for the recommended lane based on the restriction information and the attendant circumstance, the travel prohibited lane being a lane in which travel of the own vehicle is prohibited.

8. The vehicle system according to claim 7, wherein the storage unit is configured to store travel performance information including at least one of a travel distance, a travel time, and a travel frequency of each lane in which the own vehicle has traveled during manual driving, and the recommended lane determining unit is configured to raise the priority of a lane with highest travel performance based on the travel performance information.

9. The vehicle system according to claim 7, wherein the storage unit is configured to further store a preference mode including: a first preference mode; and a second preference mode to suppress a lane change as compared with the first preference mode, and
the recommended lane determining unit is configured to raise the priority of the lane in which the own vehicle is traveling at a time when the preference mode is set to the second preference mode as compared with a time when the preference mode is set to the first preference mode.

* * * * *